United States Patent [19]

Hilterhaus

[11] 3,848,689
[45] Nov. 19, 1974

[54] GAFF-SCALE WITH LOCK

[76] Inventor: Karl Hilterhaus, 19 Coeyman Ave., Nutley, N.J. 07110

[22] Filed: Apr. 30, 1973

[21] Appl. No.: 355,566

Related U.S. Application Data

[63] Continuation-in-part of Ser. No. 289,797, Sept. 11, 1972, Pat. No. 3,743,042.

[52] U.S. Cl. .................................. 177/233, 294/26
[51] Int. Cl. ............................. G01g 3/02, B65g 7/12
[58] Field of Search ......... 294/26, 110 A, 125, 126; 7/1 H; 43/1, 5; 177/131, 144, 148, 149, 232, 233

[56] References Cited
UNITED STATES PATENTS

| | | | |
|---|---|---|---|
| 452,278 | 5/1891 | McIlvaine | 177/233 |
| 722,740 | 3/1903 | Munson | 177/233 |
| 956,626 | 5/1910 | Clupka | 177/131 |
| 1,686,889 | 10/1928 | Woods | 294/26 |
| 2,446,720 | 8/1948 | Rominski | 177/31 |
| 2,570,538 | 10/1951 | Fincher et al. | 294/26 |
| 2,633,351 | 3/1953 | Fowle | 177/131 |

Primary Examiner—Richard A. Schacher
Assistant Examiner—Johnny D. Cherry
Attorney, Agent, or Firm—Popper, Bain, Bobis, Gilfillan & Rhodes

[57] ABSTRACT

A gaff-scale provided with a tubular body, slidably enclosing a generally rectangular rod extending through a generally rectangular passage at the end of the body; and the rod terminating in a sharp hook; the end of the rod within the body suspended from a spring; an index associated with the rod visible outside the body as it traverses a series of weight calibrations on the body; a latch engageable with the rod locks the hook against movement.

5 Claims, 4 Drawing Figures

PATENTED NOV 19 1974
3,848,689
FIG. 1
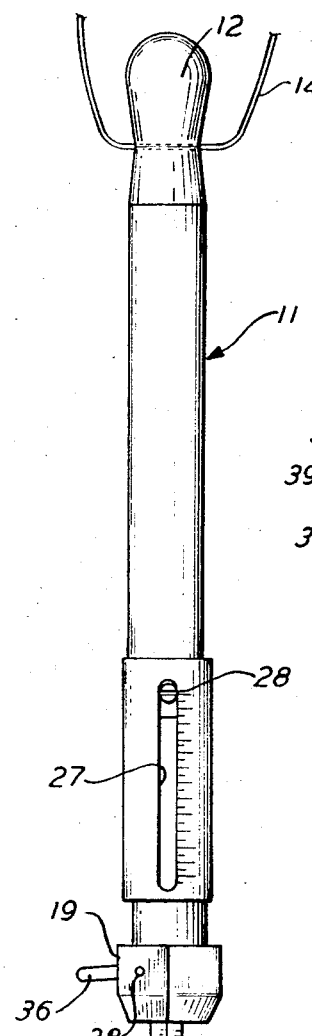
FIG. 2
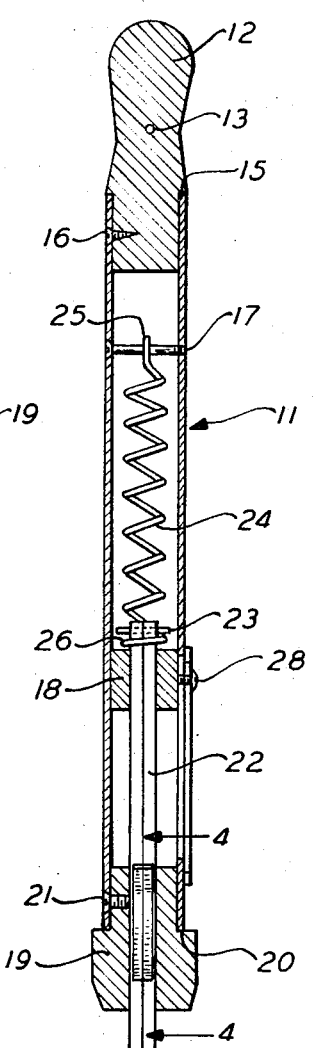
FIG. 3
FIG. 4
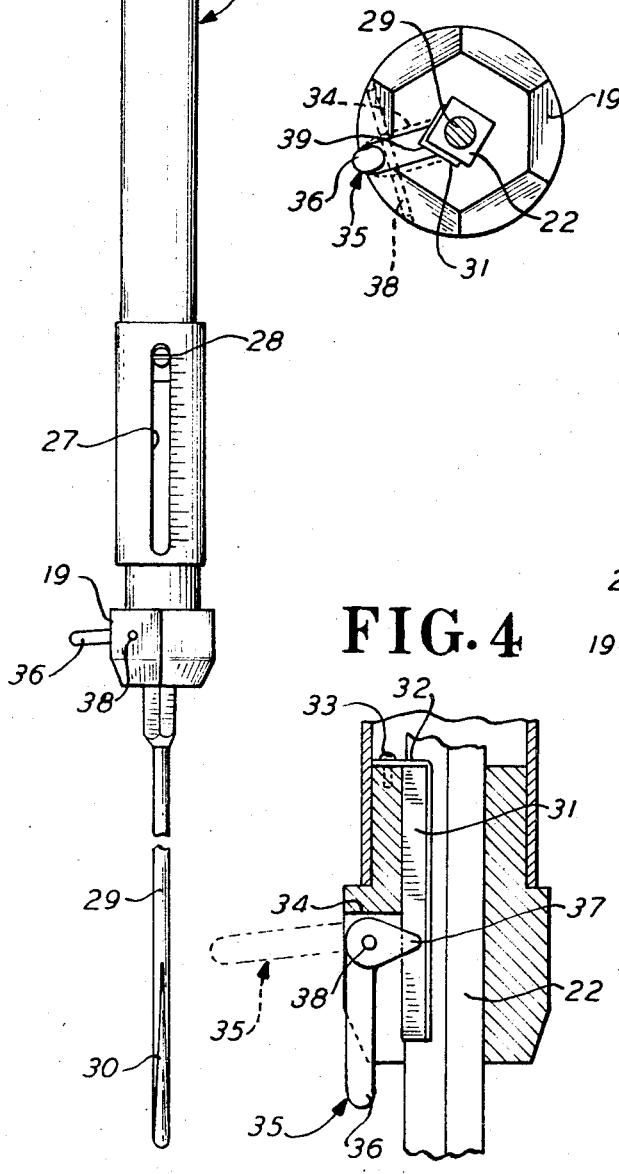

GAFF-SCALE WITH LOCK

RELATED APPLICATION

This application is a continuation in part of the applicant's pending application Ser. No. 289,797, filed Sept. 11, 1972, now U.S. Pat. No. 3,743,042, for a gaff-scale.

BACKGROUND OF THE INVENTION

1. Field of Invention

This invention relates generally to a gaff-scale, and particularly to a gaff-scale wherein the attitude of a gaffed item may be maintained constant and weighed, and the extension of the gaff controlled.

2. Prior Art.

The fisherman requires a gaff to land his catch. He requires a scale to determine its weight for commercial reasons, reasons of personal satisfaction, or for determining compliance with minimum weight laws governing a catch. The transfer of the fish from the gaff to the scale may be difficult, in the case of large, dangerous or very active fish, or those that are difficult to handle by reason of body structure. The scale may be ill adapted to hold the fish and may allow it to swivel in an ungoverned manner.

SUMMARY OF THE INVENTION

It has been found that there need be no transfer from gaff to scale, and back to gaff again. A gaff can be devised which includes a scale within its body, for determination of the weight of the catch, and which at all times permits positive control of the catch's attitude without danger of the catch swivelling in such a manner as to be discharged before being weighed and deposited in a secure place. The gaff is a tubular body with a shaft slidable in one end but not rotatable therein. The shaft is mounted on a spring and the shaft has an index marker readable against an external calibrated scale for reading weight. In addition, a latch can be provided to lock the gaff in position.

DRAWINGS

These objects and advantages as well as other objects and advantages may be attained by the device shown by way of illustration in the drawings in which:

FIG. 1 is a front elevational view of the gaff-scale;

FIG. 2 is a vertical sectional view thereof;

FIG. 3 is a sectional view taken on the lines 3—3 in FIG. 1, looking in the direction of the arrows; and FIG. 4 is a partial vertical cross section on the line 4—4 in FIG. 2, looking in the direction of the arrows.

PREFERRED EMBODIMENT

The gaff-scale has a generally tubular housing or body 11. The upper end of the body 11 is closed by a knob 12 which has a generally horizontal passage 13 through which a looped carrying cord 14 may be passed. The knob 12 may be inserted a brief distance into the body 11 up to an annular flange 15 on the knob 12. A screw 16 through the body 11 will secure the knob 12 in place. Below the knob 12, a support defining a spring anchor 17 in the form of a threaded bolt or screw, or a rod is attached diametrically in the housing. An upper guide 18 in the form of annulus is attached in the body 11. A lower guide 19 is attached as a cap to the lower end of the body 11. The lower guide 19 has an annular flange 20 so that it may be seated on the body 11. A set-screw 21 holds the lower guide 19 in place. The upper guide 18 and the lower guide 19 are provided with generally square axial passages or keyways to receive a generally square rod 22 that conforms to the axial passages and slides freely therein without rotation. The top of the rod 22 is positioned above the upper guide 18 and has a pin 23 inserted near the top of the rod 22. A spring 24 extends between the spring anchor 17 and the pin 23. The top of the spring 24 has a loop 25 engaged with the spring anchor 17. The bottom of the spring 24 has a loop 26 embracing the rod 22 below the pin 23.

The body has a slot 27. An index or pointer 28 is attached to the rod 22 and is movable near the slot, as the rod 22 is pulled to overcome the spring 24. A calibrated scale 27 is mounted on the body 11 by a screw so that its calibrations are coordinated with the position of the index 28. The lower end 29 of the rod 22, below the lower guide 19, has a generally circular cross-sectional area and terminates in an upturned pointed hook 30.

The guides 18, 19 having a non-circular cross-sectional axial passage area, and the rod 22 being likewise designed in close conformity with the guides, there can be no swivelling or rotation of the hook 30 so as to permit the loss of a gaffed fish; the catch is always under control. No transfer from gaff to scale, and back to gaff is required. By way of illustration, the cross section of the rod 22 and of the axial passages of the guides 18, 19 have been shown as square, but they may be, of course, oval, rectangular, triangular or other non-circular shapes.

The lower guide 19 is provided with a thin strip 31 transversely L-shaped. The strip 31 is intruded between the rod 22 and the lower guide 19. The strip 31, the rod 22, and the passage in the guide 19 are dimensioned to permit the rod 22 normally to slide past the strip 31 in the passage in the guide 19. A bent over top end 32 lies on top of the guide 19 and is fastened thereto by a screw 33. A slot 34 is provided in the guide to receive a pivotable latch 35. The latch 35 has a handle 36, and an offset detent 37 engageable and disengageable with the strip as the latch 35 is pivoted on a pin 38 mounted in the lower guide 19, and passing through the slot 34. The detent 37 has a channel 39 that embraces the strip 31, and causes it to frictionally engage the rod 29 when the handle 36 is pivoted down. The rod 22 then is seized between the strip 31 and the opposite wall of the passage in the lower guide 19 by the pressure of the detent 37. The rod 22 is then locked against both rotation and against axial movement with respect to the body. This prevents undesired operation of the scale when such operation is not required, avoids unnecessary stretching of the spring 24 which may exhaust its elasticity, and helps to assure more affirmative control of a fish on the hook 30, which hook can neither rotate or move outwardly with respect to the knob 12, when the latch 35 is secured.

I claim:

1. A gaff-scale comprising:
   a. a generally elongated hollow housing having a longitudinal slot,
   b. a first guide for a rod attached in the housing,
   c. a non-circular passage in the first guide,
   d. a rod in the housing having a portion slidable in the passage in the first guide, e. the portion of the rod slidable in the passage in the first guide provided with a non-circular cross-sectional configuration corresponding closely to the passage in the first guide, whereby torsional movement of the rod is inhibited;
f. a spring in the housing,
g. an end of the spring attached to the housing above the first guide,
h. another end of the spring attached to an end of the rod above the first guide,
i. an index on the rod visible in the longitudinal slot in the housing,
j. a scale on the housing arranged in visible relation to the index,
k. a second guide for the rod attached to the bottom of the housing,
l. the second guide having a non-circular passage,
m. a portion of the rod slidable in the passage in the second guide and provided with a cross-sectional configuration corresponding closely to the passage in the second guide, whereby torsional movement of the rod is inhibited,
n. an integral hook on a portion of the rod outside of the housing,
o. a strip in the passage in the second guide engageable with the rod.
p. a pivotable latch mounted in a slot in the second guide and engageable and disengageable with the strip.

2. A gaff-scale comprising:
a. the device according to claim 1,
b. a cap on the top of the housing, and
c. means attached to the cap for holding the housing suspended.

3. A gaff-scale comprising:
a. the device according to claim 1, and
b. a slot in the housing extending generally to define the limits of movement of the index when the spring is overcome.

4. A gaff-scale comprising:
a. the device according to claim 1, and
b. the passage in the first guide being generally rectangular in cross-sectional area.

5. A gaff-scale comprising:
a. the device according to claim 1, and
b. the strip in the passage in the second guide having a cross sectional shape in general conformity with the cross section of the rod,
c. a detent on the latch defining the portion of the latch engageable and disengageable with the strip, and shaped in general conformity with the cross-sectional shape of the strip at the point of engagement.

* * * * *